US011945210B2

(12) United States Patent
Eirich et al.

(10) Patent No.: US 11,945,210 B2
(45) Date of Patent: Apr. 2, 2024

(54) DEVICE FOR MOUNTING A SHEET-LIKE ROLLER COVER ON A ROLLER

(71) Applicant: KOLBUS GMBH & CO. KG, Rahden (DE)

(72) Inventors: Waldemar Eirich, Espelkamp (DE); Christian Schmale, Rahden (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days.

(21) Appl. No.: 18/044,011

(22) PCT Filed: Aug. 23, 2021

(86) PCT No.: PCT/EP2021/073261
§ 371 (c)(1),
(2) Date: Mar. 3, 2023

(87) PCT Pub. No.: WO2022/048933
PCT Pub. Date: Mar. 10, 2022

(65) Prior Publication Data
US 2024/0025169 A1 Jan. 25, 2024

(30) Foreign Application Priority Data
Sep. 4, 2020 (DE) ..................... 10 2020 123 196.2

(51) Int. Cl.
*B41F 27/12* (2006.01)

(52) U.S. Cl.
CPC ................................ *B41F 27/1231* (2013.01)

(58) Field of Classification Search
CPC .............. B41F 27/1237; B41F 27/1231; B41F 27/1225; B41F 27/005; B41F 27/00; B41F 27/06; B41F 27/1218
See application file for complete search history.

(56) References Cited

U.S. PATENT DOCUMENTS

| | | | |
|---|---|---|---|
| 3,903,796 A * | 9/1975 | Jeschke | B41F 27/005 101/415.1 |
| 4,688,483 A | 8/1987 | Schollenberger | |
| 4,831,931 A | 5/1989 | Jeschke et al. | |
| 5,088,409 A | 2/1992 | Roskosch | |
| 5,488,904 A | 2/1996 | Kleinschmidt et al. | |

(Continued)

FOREIGN PATENT DOCUMENTS

| | | |
|---|---|---|
| DE | 102010045036 A1 | 3/2012 |
| EP | 0401500 A2 | 12/1990 |

OTHER PUBLICATIONS

PCT International Search Report and Written Opinion for International Application No. PCT/EP2021/073261filed Aug. 23, 2021; dated Dec. 9, 2021; 12 pgs.

*Primary Examiner* — David H Banh
(74) *Attorney, Agent, or Firm* — Alix, Yale & Ristas, LLP

(57) ABSTRACT

A device for mounting a roller cover on a roller with a pair of tensioning rails has a plurality of identical tensioning units, which are arranged on a common pivoting beam and the partial rails of which jointly form the second tensioning rail of the tensioning rail pair, wherein said tensioning units respectively comprise a first lock assigned to the first tensioning rail and a second lock assigned to the respective partial rail, and wherein the locks selectively hold or release the roller cover.

8 Claims, 3 Drawing Sheets

(56) References Cited

U.S. PATENT DOCUMENTS

| | | | | | |
|---|---|---|---|---|---|
| 5,503,072 | A * | 4/1996 | Schneider | B41F 30/04 | 101/415.1 |
| 5,642,669 | A * | 7/1997 | Becker | B41F 27/1243 | 101/415.1 |
| 5,875,718 | A * | 3/1999 | Schild | B41F 27/1243 | 101/415.1 |
| 6,003,442 | A * | 12/1999 | Solomon | H04N 1/0813 | 101/409 |
| 6,443,066 | B2 * | 9/2002 | Stellberger | B41F 13/16 | 101/415.1 |

* cited by examiner

DEVICE FOR MOUNTING A SHEET-LIKE ROLLER COVER ON A ROLLER

BACKGROUND

The present invention pertains to a device for mounting a sheet-like roller cover on the surface area of a rotatable roller according to the preamble of claim 1.

EP0401500A2 discloses a device for adjusting and tensioning flexible printing plates on the plate cylinder of rotary printing presses. In this case, a pair of tensioning rails is oriented parallel to the rotational axis of the plate cylinder. The tensioning rails extend over nearly the entire length of the plate cylinder and are pivotably mounted on the cylinder body by means of levers. In this way, angular errors of the print image can be corrected by slightly displacing the printing plate on the plate cylinder.

The manual mounting of a roller cover on a roller is tortuous with known devices. The cover frequently slips out of the first tensioning rail of a pair in sections before it is completely fitted into the second tensioning rail and can be secured by means of the tensioning process. Wide roller covers in particular are unwieldy and mounted jointly by two persons.

The process of pressing the roller cover into an undersized receptacle groove requires a high expenditure of force and complicates the removal of the roller cover. In addition, the required force significantly increases the risk of damages to the roller, particularly if hammers are used as auxiliary means.

A concave elongation of the printing plate can be compensated with a divided tensioning rail described in DE102010045036A1. To this end, the tensioning rail is axially divided into multiple segments that can be individually acted upon with a tensioning force. Successive fitting of the roller cover into the partial rails and respective tensioning carried out immediately thereafter can simplify the handling during the mounting process, but leads to undesirable uneven elongations of the roller cover. The sequence of individual tensioning processes particularly influences the elongation and therefore the print image.

SUMMARY OF THE INVENTION

The present invention consequently is based on the objective of developing a device that is improved in comparison with the prior art and eliminates at least one of the described disadvantages of the prior art.

This objective is attained by means of a device with the characteristics of claim 1. Advantageous embodiments are disclosed in the dependent claims.

The invention proposes a mounting device for mounting a roller cover on a surface area of a rotatable roller, wherein the roller may be a printing cylinder and the roller cover may be a printing plate, and wherein said mounting device comprises a pair of tensioning rails extending parallel to the rotational axis of the roller in an area defined by the surface of the roller. The tensioning rails respectively form an undercut in the form of a groove, into which the leading edge and the trailing edge of the roller cover can be respectively fitted.

The second tensioning rail of the pair is composed of multiple identical partial rails in its longitudinal direction. Each of these partial rails is mounted on the slide of a respective tensioning unit. The respective slides can be moved essentially in the circumferential direction with one of the partial rails. In this case, the slide positions define the distance of their partial rail from the first tensioning rail of the pair and therefore the tension of the roller cover. To this end, each tensioning unit is equipped with a separate drive that acts upon the respective slide.

The mounting device comprises a lock that is assigned to the second tensioning rail. The lock is arranged relative to the second tensioning rail in such a way that it secures the non-tensioned roller cover from inadvertently slipping out of the receptacle of the partial rail in its closed arrangement and releases the roller cover from the respective partial rail in its open arrangement.

A common switch preferably is assigned to each of these separate tensioning drives. This makes it possible to individually activate the tensioning units. For example, tensioning units that are not required when using a narrow roller cover can be switched off. In addition, a wide roller cover can be purposefully elongated or distorted unevenly as needed by switching off individual tensioning units.

To this end, the lock preferably is designed in the form of a lever with a pivoting axis and mounted in such a way that the limbs of the lever can be moved in a plane, which essentially is oriented tangentially to the roll sleeve. The lock is advantageously arranged on the slide of a tensioning unit and assigned to the partial rail of this tensioning unit. In this way, the process of securing or releasing the roller cover is not affected by the position of the tensioning slide. An inadvertent release of the roller cover during premature tension relieve can thereby be prevented.

It is advantageous to arrange multiple identical tensioning units on a common pivoting beam, the pivoting axis of which essentially is arranged radially to the roller. Angular errors of the roll cover can be corrected by pivoting this beam.

An adjustment device with a controllable actuating drive preferably is assigned to the pivoting beam. In this way, angular errors of the roll cover can be corrected automatically without manual intervention. In this context, a cam control of the pivoting motion by means of a cam roller that rolls on a cam is particularly advantageous. A desired force path for the pivoting motion can be adjusted by designing the cam accordingly.

The adjustment device preferably comprises a push rod that extends through a hollow shaft in the roller. In this way, the motion-sensitive drive elements can be rigidly arranged on the frame outside the roller.

BRIEF DESCRIPTION OF THE DRAWINGS

An exemplary embodiment of the invention is described below with reference to the figures, to which we refer with respect to all details that are not mentioned in greater detail in the description. In these figures.

DETAILED DESCRIPTION

Figure 1:
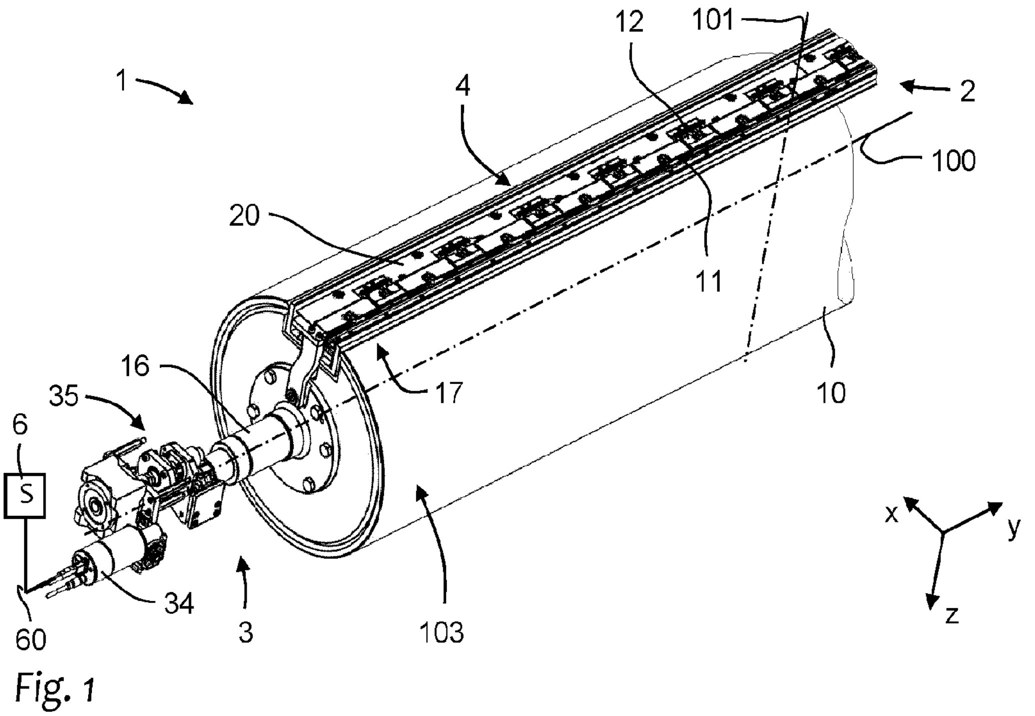
FIG. 1 shows a simplified perspective view of a printing cylinder with mounting device.
Figure 2:
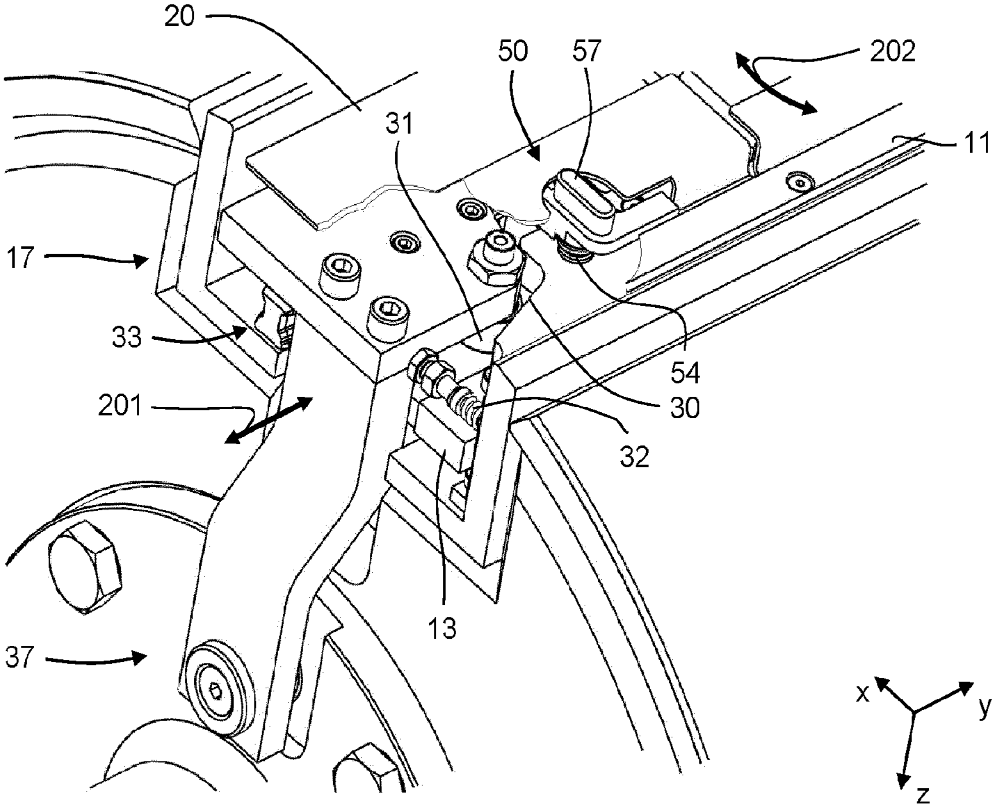
FIG. 2 shows a simplified perspective detail view of an adjustment device for pivoting a tensioning device.
Figure 3:
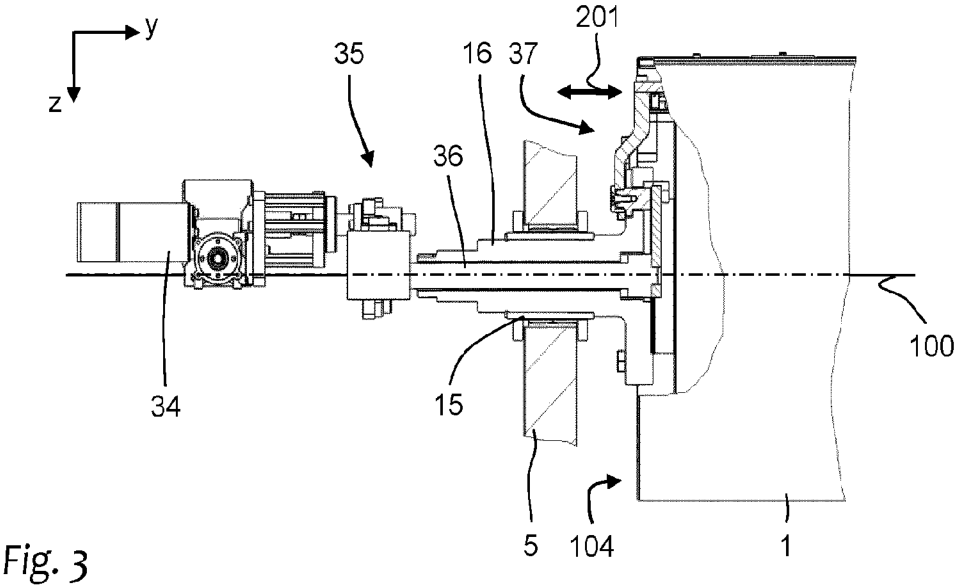
FIG. 3 shows a simplified detail view of an adjustment device for pivoting a tensioning device.

FIG. 1 shows a printing cylinder 1 with an inventive mounting device 2. A channel 17 cuts through the surface area 103 of the central cylinder 10. This channel 17 extends in the axial direction y parallel to the rotational axis 100 of the printing cylinder 1 and accommodates the mounting device 2. The printing cylinder is mounted in the machine frame 5 by means of shaft shoulders 16 arranged on both sides of the central cylinder 10 as illustrated in FIG. 3.

A first tensioning rail 11 and a second tensioning rail 12 jointly form a tensioning rail pair of the tensioning device 2. The tensioning rails 11, 12 are axially oriented parallel to one another in an area defined by the surface 103 of the cylinder 10. They are spaced apart from one another by a variable distance 70 in the circumferential direction. The first tensioning rail 11 and the second tensioning rail 12 respectively form an undercut 45 in the form of a groove that is open in the circumferential direction of the cylinder 10. The openings of these two grooves face one another. The printing plate can be respectively fitted into these grooves on its leading and trailing edges. The fitted printing plate is tensioned and thereby fixed on the cylinder 10 by shortening the distance 70 between the tensioning rails 11, 12.

The tensioning rail pair is mounted on a beam 13 of the mounting device 2. This beam 13 extends in the axial direction y in the channel 17 of the printing cylinder 1. It is mounted so as to be pivotable about an axis 101 that extends radially to the printing cylinder 1. Corrections of the angular position of the print image can be realized by slightly pivoting 202 the tensioning rails 11, 12 about the radial axis 101. An adjustment device 3 is provided for this correction. To this end, the adjustment device 3 comprises a controllable positioning drive 34. This positioning drive 34 communicates with a control 6 via data lines 60.

The positioning drive 34 acts upon the pivotable beam 13 of the tensioning device 2 by means of a gearing that axially extends through a hollow shaft 16 of the printing cylinder 1. To this end, a spindle drive 35 of the adjustment device 3 connects the positioning drive 34 to a push rod 36 that axially extends in the hollow shaft 16 of the printing cylinder 1. An arm 37 of the adjustment device 3, which is connected to this push rod 36, extends through an end face 104 of the central cylinder 10 and protrudes into the channel 17 of the printing cylinder 1. The arm 37 is mounted in the channel 17 by means of a linear guide 33. The linear guide 33 is oriented parallel to the rotational axis 100 of the printing cylinder 1 and allows an axial linear motion 201 of the arm 37. A cam roller 31 is mounted on the end of the arm 37 protruding into the channel 17. The cam roller 31 interacts with a cam 30 of the pivoting beam 13. The beam 13 is supported against the channel 17 by means of a pressure spring 32 in such a way that it always abuts on the cam roller 31 of the adjustment device 3. A linear displacement 201 of the arm 37 results in a rolling motion of its cam roller 31 on the cam 30 of the beam 13 and thereby causes its pivoting motion 202 about its pivoting axis 101.

Figure 4:
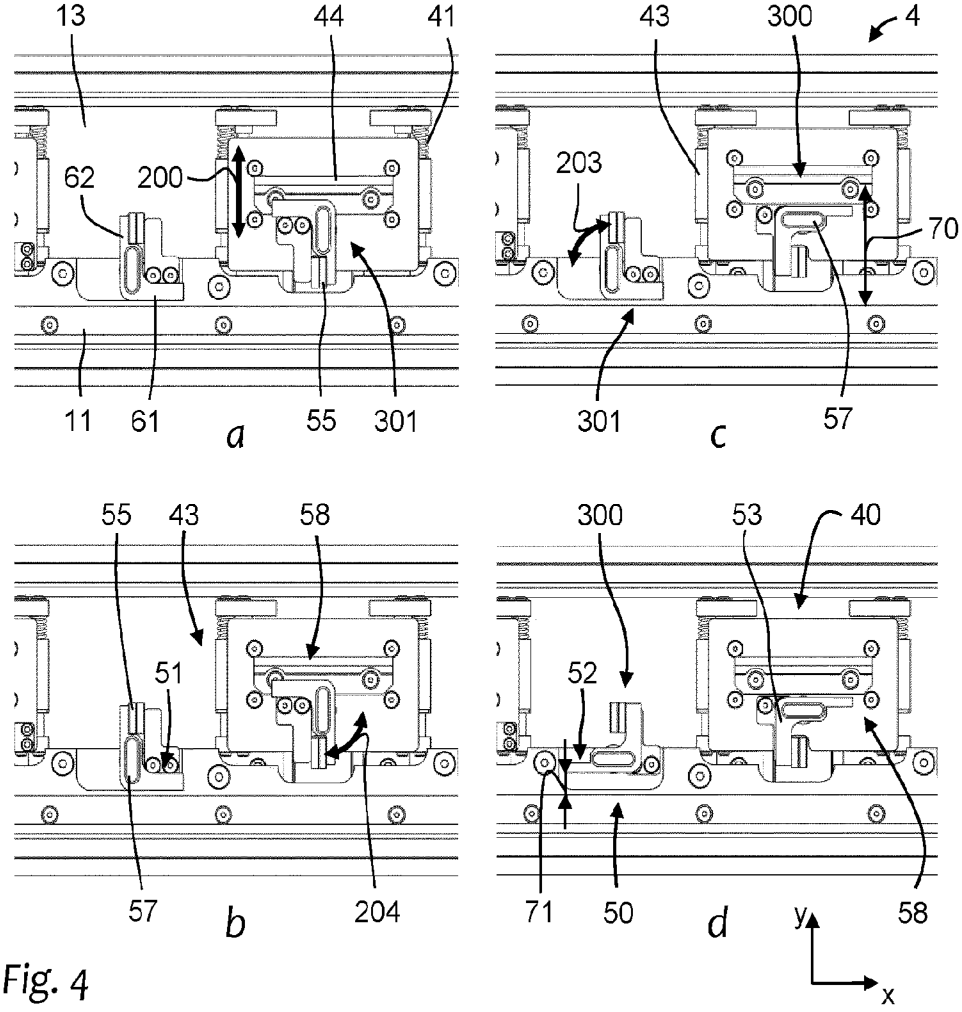
FIG. 4 shows a simplified view of a tensioning unit in different states.
Figure 5:
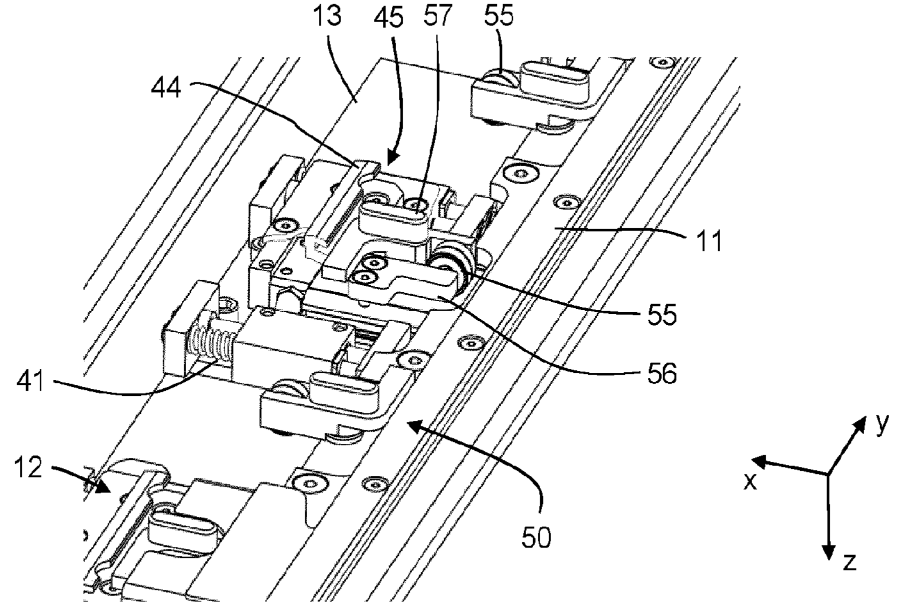
FIG. 5 shows a simplified perspective detail view of a tensioning device.
Figure 6:
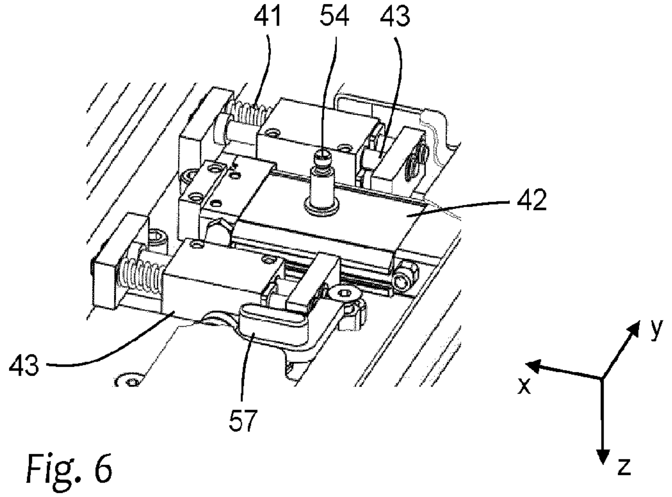
FIG. 6 shows a simplified perspective detail view of a tensioning unit.

The second tensioning rail 12 is composed of multiple sections 44 that are arranged behind one another in the axial direction y. Each of these partial rails 44 respectively forms part of one of multiple identical tensioning units 4. The design of such a tensioning unit is illustrated in FIGS. 4 to 6. The tensioning unit 4 consists of a tensioning slide 40. This tensioning slide 40 is accommodated on the pivoting beam 13 of the mounting device 2 by means of a linear guide 43 and carries one of the partial rails 44. The linear guide 43 essentially is oriented radially to the central cylinder 10 of the printing cylinder 1 and defines the direction of the linear tensioning motion 200. To this end, it comprises two parallel guide rails.

Figure 7:
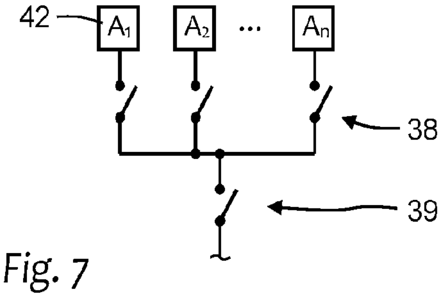
FIG. 7 shows a switching logic of the locks of a tensioning device.

The tensioning slide 40 of the tensioning unit 4 is actuated by a separate drive. This drive displaces the slide between the two end positions. The end position, in which the printing plate is tensioned, is illustrated in FIG. 4*a*. Pressure springs 41 hold the tensioning slide 40 in this end position and act upon the partial rail 44 with the tensioning force. In order to relieve the tension of the printing plate, a pneumatic cylinder 42 overrides the pressure springs 41 such that the tensioning slide 40 assumes the other end position as illustrated in FIGS. 4*b-d*. Each tensioning unit 40 has a separate switch 38 for its drive. This switch may simply be a manually actuated valve that is not illustrated in the figures. This makes it possible to activate or deactivate individual tensioning units 40. In order to realize an automated actuation of the tensioning units 40, the pressure lines of the individual tensioning units 40 are combined into a central pressure line as illustrated in FIG. 7 and said central pressure line contains a common switch 39 in the form of a mechanically controllable multi-port valve. The common valve and the respective separate valve are arranged in the form of an AND-circuit.

Each tensioning unit 40 comprises a first lock 50 that is assigned to the first tensioning rail 11. This lock is arranged opposite of the groove of the first tensioning rail 11, which accommodates the printing plate, and designed for releasing the receptacle in order to change the printing plate, as well as for locking the receptacle in order to tension the printing plate. To this end, this first lock 50 is mounted on the pivoting beam 13 of the tensioning device 2 and can assume a closed position 301 illustrated in FIGS. 4*a-c* and an open position 300 illustrated in FIG. 4*d*.

The first lock 50 is realized in the form of a lever 53 with two limbs 61, 62 that are arranged orthogonal to one another. It is accommodated in a pivot bearing 54 of the slide 40 so as to be pivotable about an axis extending radially to the printing cylinder. In its closed position 301, the first limb 61 of the first lock 50 is aligned parallel to the first tensioning rail 11. The opening width 71 between the first tensioning rail 11 and the first lock 50 is small such that an inserted printing plate is reliably prevented from slipping out. The second limb 62 points in the direction of the second tensioning rail 12 and the second contact surface 52 located on its rear side is held by a magnet 55.

In its open position 301, the second limb 62 of the first lock 50 is oriented parallel to the first tensioning rail. The opening width 71 is greater than in the closed position 301 such that the printing plate can be easily fitted or removed. In this case, the first limb 61 points in the direction of the second tensioning rail 12 and is held by the magnet 55 with the first contact surface 51 arranged on its rear side. A handle 57 mounted on the lever 53 by means of a pivot bearing 54 is provided for actuating the first lock 50.

A second lock 58 of each tensioning unit 4 is arranged on the respective tensioning slide 40 opposite of the receptacle groove of the associated partial rail. With respect to its function and construction, the second lock corresponds to the first lock 50 and therefore is not described in greater detail.

The tensioning device 2 has a plurality of identical tensioning units 40 of the above-described type, which are arranged on the common pivoting beam 13.

FIGS. 4*a-d* show the individual states of an individual tensioning unit 4 while changing and tensioning a printing plate. The printing plate itself is not illustrated. FIG. 4*a* begins with the tensioned state, in which the plate is tensioned and both locks 50, 58 are respectively held in their closed position 301. If the separate valve is open, the pneumatic cylinder 42 overrides the tensioning spring 41 when the common multi-port valve is opened such that the slide 40 is displaced into the end position illustrated in FIG. 4*b*. The distance 70 between the tensioning rails 11, 12 is increased and the tension of a fitted printing plate is relieved. Opening of the second lock 58 according to FIG. 4*c* releases a first edge of the printing plate such that it can be unwound from the printing cylinder. The printing plate can be completely removed when the first lock is also in its open position 300 as illustrated in FIG. 4*d*. A plate is mounted and tensioned in reverse order.

REFERENCE SYMBOLS

1 Printing cylinder
2 Mounting device
3 Adjustment device, pivoting motion
4 Tensioning unit
5 Machine frame
6 Control
10 Roller
11 First rail
12 Second rail
13 Beam
15 Pivot bearing
16 Hollow shaft
17 Channel
20 Cover
30 Cam
31 Cam roller
32 Pressure spring
33 Linear guide
34 Positioning drive
35 Spindle drive
36 Push rod
37 Arm
38 Switch
39 Group switch
40 Tensioning slide
41 Pressure spring
42 Pneumatic cylinder
43 Linear guide
44 Tensioner
45 Undercut
50 First lock
51 First contact surface
52 Second contact surface
53 Lever
54 Pivot bearing
55 Magnet
56 Holder
57 Handle
58 Second lock
60 Data line
61 First limb
62 Second limb
70 Distance
71 Opening width
100 Rotational axis
101 Pivoting axis
102 Rotational axis
103 Surface area
104 End face
200 Linear tensioning motion
201 Linear adjusting motion
202 Pivoting motion
203 First rotary motion
204 Second rotary motion
300 Open arrangement
301 Closed arrangement

The invention claimed is:

1. A device for mounting a sheet-like, flexible roller cover, such as a printing plate, around the surface area (103) of a roller (10), such as a printing cylinder, wherein the roller (10) is rotatable about a rotational axis (100), said device comprising a first rail (11) that extends parallel to the rotational axis (100) of the roller (10) and is arranged in an area defined by the surface of the roller (10), a second rail (12) that extends parallel to the rotational axis (100) of the roller (10), is arranged in the area defined by the surface of the roller (10) and composed of a plurality of partial rails (44), wherein the first rail (11) and the second rail (12) respectively have an undercut (45) for accommodating the roller cover in a form-fitting manner, and wherein the first rail (11) and the second rail (12) are spaced apart from one another by a variable distance (70) in the circumferential direction of the roller (10), as well as at least two tensioning units (4) that are spaced apart from one another in the direction of the rotational axis (100) of the roller (10) and respectively comprise a slide (40) that is movable in the circumferential direction of the roller (10), a drive (42) operatively connected to the slide (40) and one of the plurality of partial rails (44) that is arranged on the slide (40) and forms part of the second rail (12), wherein a lock (58) is arranged opposite of at least one of the plurality of partial rails (44), wherein the lock (58) alternately has an open arrangement (300) and a closed arrangement (301) with respect to the at least one associated partial rail (44) and forms a closable receptacle together with the at least one partial rail (44).

2. The device of claim 1, wherein each of the at least two tensioning units (4) has a separate switch (38) assigned to the drive (42) to allow each tensioning unit (4) to be disconnected from the drive (42), and a group of the at least two tensioning units (4) has a common switch (39) connecting the group of the at least two tensioning units (4) to the drive (42), wherein each of the separate switches (38) of the at least two tensioning units (4) of the group and the common switch (39) of the same group are interconnected in the form of an AND-circuit.

3. The device of claim 1, wherein the at least one lock (58) is formed by a lever (53) that has two limbs (61, 62) and is rotatable about an axis, wherein the rotational axis extends radially to the roller (10) and the two limbs (61, 62) of the lever (53) jointly define a plane, and wherein said plane is aligned perpendicular to the rotational axis of the lever (53).

4. The device of claim 1, wherein at least one of the at least two tensioning units (4) has a lock (58), which is assigned to the partial rail (44) of the at least one tensioning unit (4).

5. The device of claim 1, comprising a beam (13) that extends parallel to the rotational axis (100) of the roller (10)

and is pivotable relative to the roller (10) about a pivoting axis (101), wherein the at least two tensioning units (4) are arranged on said beam, and wherein the pivoting axis (101) of the beam (13) extends orthogonal to the rotational axis (100) of the roller (10).

6. The device of claim 5, comprising an adjustment device (3) of the beam (13) with a controllable actuating drive (34), wherein the controllable actuating drive (34) is connected to a control (6) to exchange signals via a data line (60).

7. The device of claim 5, comprising an adjustment device (3) of the beam (13) with a cam (30) and a cam roller (31), which rolls on the at least one cam (30) to pivot the beam (13).

8. The device of claim 6, wherein said adjustment device (3) comprises a push rod (36) arranged collinear to the rotational axis (100) of the roll (10) and extending from the controllable actuating drive (34) through a hollow shaft (16) of the roller (10).

* * * * *